(12) United States Patent
Lee et al.

(10) Patent No.: US 12,290,054 B2
(45) Date of Patent: May 6, 2025

(54) RECIRCULATING AQUACULTURE SYSTEM USING BIOFLOC FERMENTER AND AQUAPONICS

(71) Applicant: REPUBLIC OF KOREA (NATIONAL FISHERIES RESEARCH AND DEVELOPMENT INSTITUTE), Busan (KR)

(72) Inventors: Jeongho Lee, Gyeongsangnam-do (KR); Yeongsik Lee, Changwon-si (KR); Jun-young Song, Busan (KR); Hyeongsu Kim, Gyeongsangnam-do (KR); Nana Kim, Jeollonam-do (KR); Jihwan Moon, Gyeongsangnam-do (KR)

(73) Assignee: Republic of Korea (National Fisheries Research and Development Institute), Busan (KR)

( * ) Notice: Subject to any disclaimer, the term of this patent is extended or adjusted under 35 U.S.C. 154(b) by 144 days.

(21) Appl. No.: 17/638,233

(22) PCT Filed: Aug. 25, 2020

(86) PCT No.: PCT/KR2020/011289
§ 371 (c)(1),
(2) Date: Feb. 25, 2022

(87) PCT Pub. No.: WO2021/040365
PCT Pub. Date: Mar. 4, 2021

(65) Prior Publication Data
US 2022/0312747 A1 Oct. 6, 2022

(30) Foreign Application Priority Data
Aug. 26, 2019 (KR) .......... 10-2019-0104200

(51) Int. Cl.
*A01K 63/04* (2006.01)
*A01G 31/02* (2006.01)
(Continued)

(52) U.S. Cl.
CPC ............ *A01K 63/045* (2013.01); *A01G 31/02* (2013.01); *A01K 61/10* (2017.01); *A01K 61/17* (2017.01);
(Continued)

(58) Field of Classification Search
CPC ........ A01K 61/00; A01K 61/10; A01K 63/00; A01K 63/003; A01K 63/04; A01K 63/042;
(Continued)

(56) References Cited

U.S. PATENT DOCUMENTS

| 4,268,387 A * | 5/1981 | Hall ....................... B01D 29/05 |
|---|---|---|
| | | 210/260 |
| 2005/0061737 A1* | 3/2005 | Linden .................... C02F 3/302 |
| | | 210/903 |

(Continued)

FOREIGN PATENT DOCUMENTS

| KR | 10-0458322 B1 | 11/2004 |
|---|---|---|
| KR | 10-0999299 B1 | 12/2010 |

(Continued)

OTHER PUBLICATIONS

International Search Report Corresponding to PCT/KR2020/011289 mailed Nov. 13, 2020.
(Continued)

*Primary Examiner* — Joshua J Michener
*Assistant Examiner* — Nicole Paige MacCrate
(74) *Attorney, Agent, or Firm* — Finch & Maloney PLLC (57) ABSTRACT

A recirculating aquaculture system using a biofloc fermenter and aquaponics may include a breeding water tank that
(Continued)

breeds farmed fish, a drum filter that filters breeding water drained from the recirculating aquaculture system; an automatic filtration system in which the breeding water of the drum filter is moved and purified; a biofloc fermentation system that supplies and mixes oxygen to backwash water of the automatic filtration system; and a plant cultivation system that cultivates plant with the breeding water mixed with stable and high-concentration oxygen moved from the biofloc fermentation system.

3 Claims, 10 Drawing Sheets

(51) Int. Cl.

| | | |
|---|---|---|
| *A01K 61/10* | (2017.01) | |
| *A01K 61/17* | (2017.01) | |
| *B01D 33/073* | (2006.01) | |
| *C02F 1/00* | (2023.01) | |
| *C02F 3/20* | (2023.01) | |
| *C02F 101/16* | (2006.01) | |
| *C02F 103/20* | (2006.01) | |

(52) U.S. Cl.
CPC .......... *A01K 63/042* (2013.01); *B01D 33/073* (2013.01); *C02F 1/004* (2013.01); *C02F 3/20* (2013.01); *C02F 2101/166* (2013.01); *C02F 2103/20* (2013.01); *C02F 2301/046* (2013.01); *C02F 2301/08* (2013.01)

(58) Field of Classification Search
CPC ...... A01K 63/045; A01G 31/00; A01G 31/02; A01G 2031/006; A01G 33/00
See application file for complete search history.

(56) References Cited

U.S. PATENT DOCUMENTS

| | | | |
|---|---|---|---|
| 2007/0163952 A1* | 7/2007 | Schreier | A01K 63/04 |
| | | | 210/605 |
| 2011/0131880 A1* | 6/2011 | Kloas | A01K 63/00 |
| | | | 47/62 R |
| 2018/0125041 A1* | 5/2018 | Holm | A01K 63/045 |

FOREIGN PATENT DOCUMENTS

| | | |
|---|---|---|
| KR | 10-1370075 B1 | 3/2014 |
| KR | 101507057 B1 * | 3/2015 |
| KR | 10-1549217 B1 | 9/2015 |
| KR | 2019-0040570 A | 4/2019 |

OTHER PUBLICATIONS

Written Opinion Corresponding to PCT/KR2020/011289 mailed Nov. 13, 2020.

* cited by examiner

RECIRCULATING AQUACULTURE SYSTEM USING BIOFLOC FERMENTER AND AQUAPONICS

TECHNICAL FIELD

The present invention relates to a recirculating aquaculture system using a biofloc fermenter and aquaponics.

BACKGROUND ART

With population growth, the problem of food resources became more important. Among the food resources, most of the protein supply has been centered on meat supply through livestock farming on land. On the other hand, in the supply by livestock, problems such as low productivity, mortality due to disease, and environmental pollution due to manure are being highlighted.

The aquaculture is also a method that has been practiced for many years by mankind to obtain the necessary food, and is emerging as an alternative for increasing the amount of catch that has been reduced due to habitat destruction due to pollution of the marine environment, overfishing, and the like.

The aquaculture varies depending on the type and size of fish, environmental conditions, etc. As the aquaculture, flow-through, static, circulation filtration, and cage aquaculture are mainly performed. Among them, the flow-through or continuous replacement system (CRS) is a system of continuously flowing breeding water. However, a large amount of breeding water is drained into a water system, which causes environmental pollution and increases energy and cost for temperature management of breeding water.

Recently, as regulations on water drained from farms are getting stronger, the need for a system to reduce or purify water drained from farms has also increased. A recirculating aquaculture system (RAS) is one such example, and may be capable of high-density aquaculture and may increase productivity, and may be operated even with a small amount of water and may save enormous power consumption by reusing breeding water required for aquaculture. However, the RAS is borne in development costs, installation costs, and operating costs, which is the reason why the RAS is not preferred over CRS.

Aquaponics is a combination of RAS and hydroponics, and performs both fish farming and plant cultivation in one integrated system. That is, by using metabolic by-products of fish for additional crop cultivation, the aquaponics creates economic value or is eco-friendly in terms of water quality management, and as a result, is advantageous for the fish production system.

Nevertheless, since the existing system using the aquaponics uses aquaculture water for cultivation purposes and then drains the aquaculture water as it is, the system has a limitation in that it cannot reduce the drain water. On the other hand, even if the aquaponics is applied to the RAS, it may be helpful to breed fish if the water quality may be managed once again before the aquaculture water is returned and reused as breeding water.

*RELATED PATENT LITERATURE

Korean Patent Laid-Open Publication No. 2019-0040570 (published on Apr. 19, 2019)
Korean Patent No. 10-1549217 (Registered on Aug. 26, 2015)
Korean Patent No. 10-1507057 (Registered on Mar. 24, 2015)
Korean Patent No. 10-1370075 (Registered on Feb. 26, 2014)

DISCLOSURE

Technical Problem

The present invention is to stably manage water quality of organic matters generated in a recirculating aquaculture system using a biofloc technology, improve productivity of aquaponics culture and hydroponics plants through nutrients generated by a decomposition of the organic matters, and minimize drainage of drain water.

Technical Solution

In an aspect, a recirculating aquaculture system using a biofloc fermenter and aquaponics may include: a breeding water tank that breeds farmed fish; a drum filter that filters breeding water drained from the recirculating aquaculture system; an automatic filtration system in which the breeding water of the drum filter is moved and purified; a biofloc fermentation system that supplies and mixes oxygen to backwash water of the automatic filtration system; and a plant cultivation system that cultivates plant with the breeding water mixed with stable and high-concentration oxygen moved from the biofloc fermentation system.

The recirculating aquaculture system may further include: a circular or polygonal breeding water tank; an air stone that is provided on one side of the breeding water tank and supplies oxygen to water; and a submersible pump that forms a flow in the water of the breeding water tank.

The recirculating aquaculture system may further include: a supply pipe; a fermenter in which biofloc breeding water supplied through the supply pipe is stored or fermented; and an oxygen supply device for generating water flow formed inside the fermenter to increase an amount of dissolved oxygen of the biofloc breeding water and to prevent organic matter from being precipitated through water flow generation.

The recirculating aquaculture system may further include: a water outlet pipe that has the fermented breeding water moved to a storage tank or the stored breeding water moved to a plant cultivation system therethrough and is installed on one side of the fermenter; and a sensor unit that measures water quality of the stored biofloc breeding water and is installed inside the fermenter.

In another aspect, a recirculating aquaculture system using a biofloc fermenter and aquaponics may include: a breeding water tank that breeds farmed fish; and a circulation structure that purifies breeding water drained from the recirculating aquaculture system into breeding water for plant cultivation in a biofloc fermentation system, supplies the purified breeding water to a plant cultivation system, uses the purified breeding water, and then supplies the purified breeding water to the recirculating aquaculture system.

In still another aspect, a recirculating aquaculture system using a biofloc fermenter and aquaponics may include: a breeding water tank that breeds farmed fish; a first filtration unit that separates a solid from drain water of the breeding water tank; a second filtration unit that secondarily filters water passing through the first filtration unit; a biofloc fermenter that proliferates microorganisms of the water that passes through the second filtration unit and stabilizes water quality; a cultivation unit that is formed to allow plant cultivation through the water passing through the biofloc fermenter; and a third filtration unit that filters the water passing through the cultivation unit and transmits the filtered water back to the breeding water tank.

The breeding water tank may include: a pump that forms a recirculating water flow; and a ring-type air supply unit that is disposed at a bottom to prevent precipitation of an organic solid in a low flow velocity region of a center of the recirculating water flow.

The first filtration unit may include a drum filter formed to separate the solid by rotation, and the second filtration unit may be formed in a form having a backwash mode by changing a direction of the water flow.

The biofloc fermenter may be configured so that sludge and organic matter included in backwash water generated by backwashing of the second filtration unit are decomposed by heterotrophic bacteria to stabilize the water quality.

The biofloc fermenter may be formed in plurality, and may be formed so that the breeding water is processed step by step.

The third filtration unit may include a biological filtration tank to remove nitrite included in water that passes through the cultivation unit.

Advantageous Effects

According to the present invention, a recirculating aquaculture system is an eco-friendly system that does not produces drain water at all by performing water treatment on breeding water using organic matters generated from aquaculture organisms bred in the recirculating aquaculture system by a biofloc technology (BFT), supplying the breeding water to culture plants to be absorbed by the culture plants, and then supplying the breeding water from which nitrate oxide such as ammonia has disappeared to the aquaculture organisms again, and may be implemented in various forms by adding a tank and regulating the amount of breeding water according to the size.

The present invention is a breeding system that uses RAS breeding water to recycle organic matters generated by applying a recirculating method to biofloc, remove the sludge and organic matters, ferment BFT breeding water, and grow plants through a series of processes. It is possible to reduce the risk of diseases from the outside by circulating a breeding water of a closed circuit, reduce heating costs by minimizing the inflow of groundwater, and prevent environmental problems by preventing drain water from being produced. It is possible to reduce the risk of toxicity occurring during fish breeding by removing ammonia and nitrite nitrogen from fish breeding through plant cultivation, reduce plant nutrition costs by supplying minerals generated by using fish breeding water, and produce fish and plants at the same time. As a result, it is possible to increase the productivity of aquaculture organisms and cultivated plants by the combination of RAS, BFT and aquaponics, and reduce costs such as heating costs to greatly improve economic efficiency by completely washing organic and inorganic substances and managing water quality more effectively to make the supply of breeding water unnecessary through complete water circulation.

BEST MODE

According to the present invention, organic matters generated in a recirculating aquaculture system (RAS) is connected to an aquaponics system through a fermenter using a biofloc (BFT) system, and transferred back to the recirculating aquaculture system for reuse. For this, breeding water drained through a breeding water tank of the RAS aquaculture system passes through a drum filter to remove sludge and the organic matters. The breeding water that has passed through the drum filter passes through four circulation paths as follows.

1. The breeding water filtered from the drum filter is re-supplied to the RAS aquaculture system through a circulation filtration system.

2. Backwash water including the unfiltered sludge and organic matters is transferred from the drum filter to a breeding water automatic filtration system.

3. The breeding water filtered by a cartridge filter of the breeding water automatic filtration system moves back to the drum filter to remove the sludge and organic matters again, and the filtered breeding water may be re-supplied to the RAS aquaculture system by the above process 1.

4. After passing through the breeding water automatic filtration system, backwash water that is not filtered by the cartridge filter may pass through a biofloc fermentation system and a plant cultivation system, and then, the breeding water may be moved to the circulation filtration system and re-supplied to the RAS aquaculture system.

Hereinafter, an aquaponics system related to the present invention will be described in detail with reference to a specific configuration and accompanying drawings.

Figure 1:
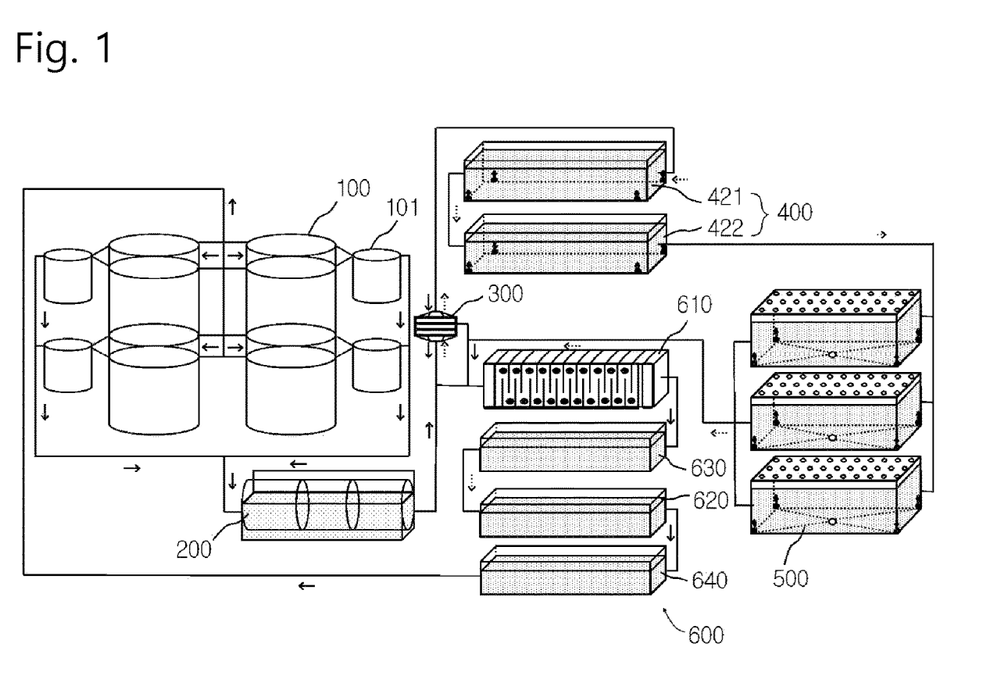
FIG. 1 is a conceptual diagram of an aquaponics system related to the present invention.

FIG. 1 illustrates a schematic diagram of an aquaponics system that recycles organic matters generated in a recirculating aquaculture system of the present invention to a biofloc system.

The breeding water containing organic matters generated in the recirculating aquaculture system passes through a drum filter 200 that filters the breeding water drained from the recirculating aquaculture system in order to be transferred to the fermenter 400 using the biofloc system. The breeding water filtered from the drum filter passes through an automatic backwash organic solid remover 300 for regulating the amount of organic matters and is supplied to the fermenter 400 using the biofloc system.

The drain water that has passed through the breeding water tank 100 for breeding aquaculture target species goes through primary physical filtration through the solid remover 101 and then moves to the drum filter 200 to further remove solids.

Thereafter, the drain water directly moves to a precipitation tank 610 or BFT primary fermenters 421 and 422 through the automatic backwash organic solid remover 300 (automatic filtration system). In the case of the breeding water that has been stabilized by the BFT primary fermenter, BFT water production is completed in the secondary fermenter 422, and hydroponic plants are grown again with BFT breeding water in a plant cultivation tank 500.

The drain water that has passed through the plant cultivation tank 500 is moved to the automatic backwash organic solid remover 300 again and enters the precipitation tank 610, and the breeding water introduced into the precipitation tank passes through a foam separation tank 630 and a biological filtration tank 620 again to complete the final water purification. The purified breeding water is again stored in a purified water storage tank 640 and is introduced back into the breeding water tank.

When the breeding water is stable so that it may be used for plants in the fermenter 400 using the biofloc system, the breeding water is moved to the plant cultivation system 500 capable of plant cultivation and is used for plant growth. Thereafter, the drained breeding water passes through the automatic backwash organic solid remover 300 and then the precipitation tank and the foam separation tank, and is stored in a storage tank to be used in the recirculating aquaculture system 100. The breeding water is supplied to the recirculating aquaculture system 100 when necessary.

A filtration system 600 of the present invention may include the conventionally known precipitation tank 610, biological filtration tank 620, foam separation tank 630, and purified water storage tank 640. In addition, the breeding water introduced into the precipitation tank goes through a series of purification processes by passing through the biological filtration tank and the foam separation tank, and then is stored in the purified water storage tank, and may be re-supplied as breeding water of the recirculating aquaculture system 100.

The biological filtration tank fills the inside of the biological filtration tank filled with a ring or ball-shaped fluid filter medium by a fluid filtration method, is provided with an oxygen supply device capable of aeration, and filters breeding water introduced thereinto and then drains the breeding water. In this way, the activity of aerobic bacteria is activated in a nitrification process that converts ammonia nitrogen into nitrate nitrogen while increasing dissolved oxygen by using aeration and fluid filter media, so the breeding water may be purified.

Figure 2:
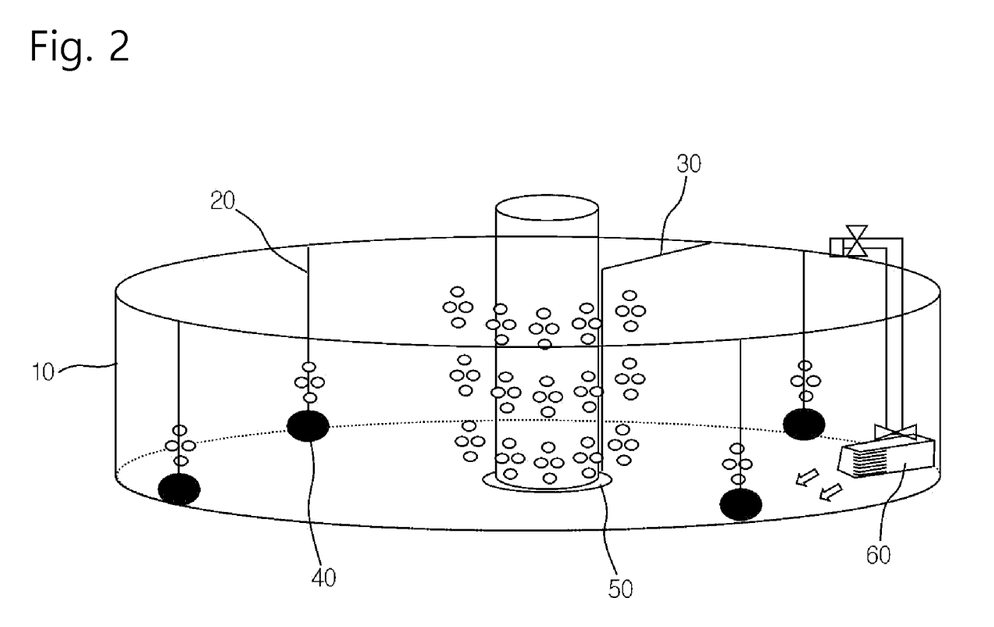
FIG. 2 is a diagram illustrating a breeding water tank of the recirculating aquaculture system related to the present invention.
Figure 3:
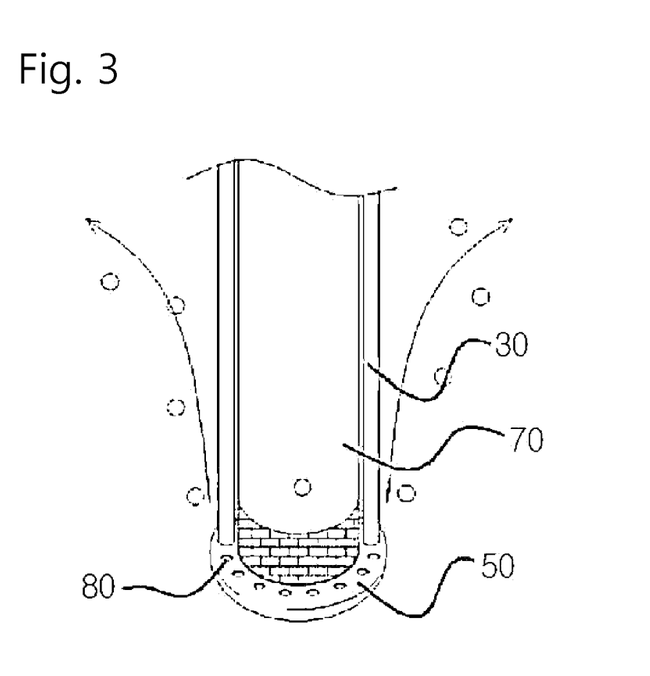
FIG. 3 is a conceptual partial cross-sectional perspective view of a micro air supply pipe related to the present invention.

FIG. 2 illustrates the breeding water tank 10 of the recirculating aquaculture system related to the present invention, and FIG. 3 illustrates a minute air supply pipe related to the present invention. The breeding water tank 10 of the recirculating aquaculture system may be formed in a circular or polygonal shape, and on one side surface of the inside of the breeding water tank 10 is provided with one or more air stones 40 that are connected to an air stone oxygen supply pipe 20 connected to an oxygen generator on any one side thereof to supply oxygen and start and maintain the aeration of the breeding water, a minute air supply pipe 50 that is provided with a through hole through which bubbles are generated at a bottom of the aquaculture water tank, an air supply pipe 30 connected to one side or both sides of the minute air supply pipe to supply air to the minute air supply pipe, and a submersible pump 60 that supplies power to form a water flow.

The breeding water forms a water flow by rotating edges of the breeding water tank around the center by the air stone, so solid masses formed in the breeding water are gathered in the center of the breeding water tank with a relatively low water flow rate.

A drainage system for regulating the level of the breeding water is also installed in the center of the breeding water tank. A drain hole is formed at the bottom, and a water rod that may block the pipe is installed at the top. The solid masses distributed in the breeding water sink to the bottom and are accumulated as the water flow rate decreases, especially, in the vicinity of the water rod.

The submersible pump sucks the breeding water and drains the sucked breeding water into the breeding water tank through a pump outlet to rotate the breeding water in the tank. The pump outlet may be provided with a filter to remove large solids, and may be separately provided with a valve (not illustrated) to regulate an agitation rate of the breeding water.

A lower end portion of the water rod 70 is provided with the minute air supply pipe 50 that is installed around the water rod. The minute air supply pipe may be formed in a circular ring shape so that the water rod may be provided around the circle. An air through hole 80 through which air is drained may be formed in the upper or side portion of the minute air supply pipe, and the air supply pipe 30 may be connected to one side to supply air to the minute air supply pipe.

When air is supplied through the air supply pipe, bubbles are formed around the water rod, and as the bubbles rise to the top of the breeding water, the solid masses accumulated at the lower end portion of the water rod also rise and gather in the center of the water surface but are dispersed, so the solids in the breeding water may be removed.

In addition, to help the water circulation of the breeding water in the circular tank, the breeding water tank includes an air hose for aeration, an air hose that is connected to an oxygen generator for oxygen supply, an air stone, and a union hose that may make prototypes, and a submersible pump and increases the amount of dissolved oxygen in the breeding water by the supplied oxygen, and is configured so that the amount of dissolved oxygen in the breeding water is increased by the supplied oxygen, and the breeding water circulates evenly in the tank to prevent precipitates from being formed.

The minute air supply pipe may be made of plastic, silicone tube, etc., but is not limited thereto. The air through hole may be formed in the upper portion or the side portion of the minute air supply pipe, but is not limited thereto, and fine air may be formed by forming the minute air supply pipe using a porous material in which a plurality of irregular through holes are formed.

Figure 4:
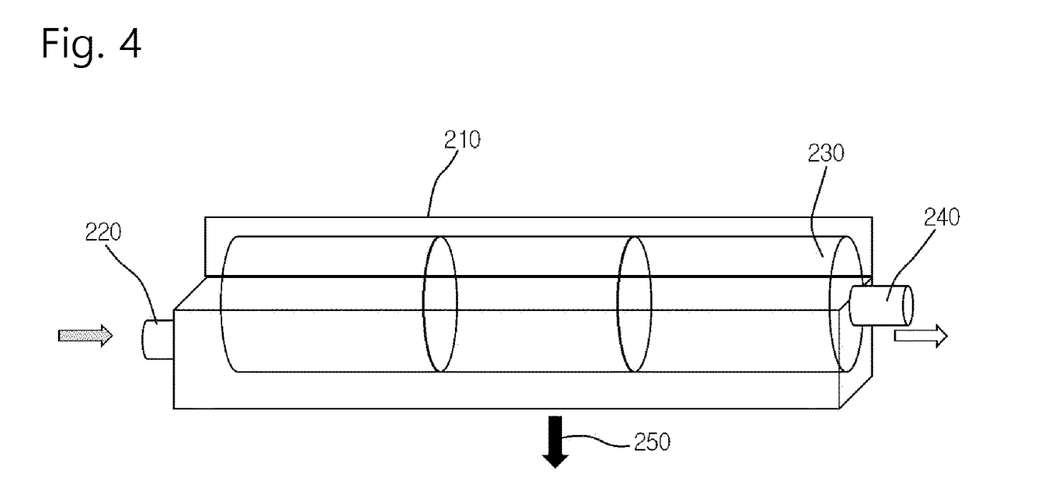
FIG. 4 is a conceptual perspective view of a drum filter related to the present invention.

FIG. 4 illustrates the drum filter of the present invention. The drum filter 200 of the present invention may be configured to include a drum filter case 210 that has a conventional drum screen (screen filter) structure and is provided with a space of a certain size for storing breeding water, an intake pipe 220 that is provided on any one side of the drum filter case so that the breeding water drained from the RAS aquaculture system flows into the inside, a screen filter 230 that is provided installed inside the drum filter case to remove foreign substances from the introduced breeding water, a drain pipe 240 that is provided on a side surface of the drum filter case facing the intake pipe to drain breeding water from which foreign substances are removed, and an outlet 250 that is may be provided at the bottom of the drum filter case to drain the foreign substances filtered by the screen filter.

The breeding water drained after being used for aquaculture in the RAS aquaculture system is introduced into the drum filter case through the intake pipe. The screen filter of the conventionally known structure is provided inside the drum filter case. Preferably, a filtering process is carried out in which the foreign substances contained in the breeding water rises and is collected in a rotational direction by continuously rotating a part of the screen having the cylindrical structure with a number of holes while submerged in the breeding water introduced into the drum filter case. The foreign substances may be typically 30 micrometers or more.

By depressurizing the inside of the screen filter, the breeding water is sucked into the filter, and the foreign substances are filtered by the filter and remain outside the filter. In this case, the breeding water moves with rotation in the inflow direction thereinto and is drained through the drain pipe after the foreign substances are filtered out. In addition, the foreign substances remaining outside the filter are drained through the outlet formed in the lower portion of the drum filter case after falling off the filter.

Figure 5:
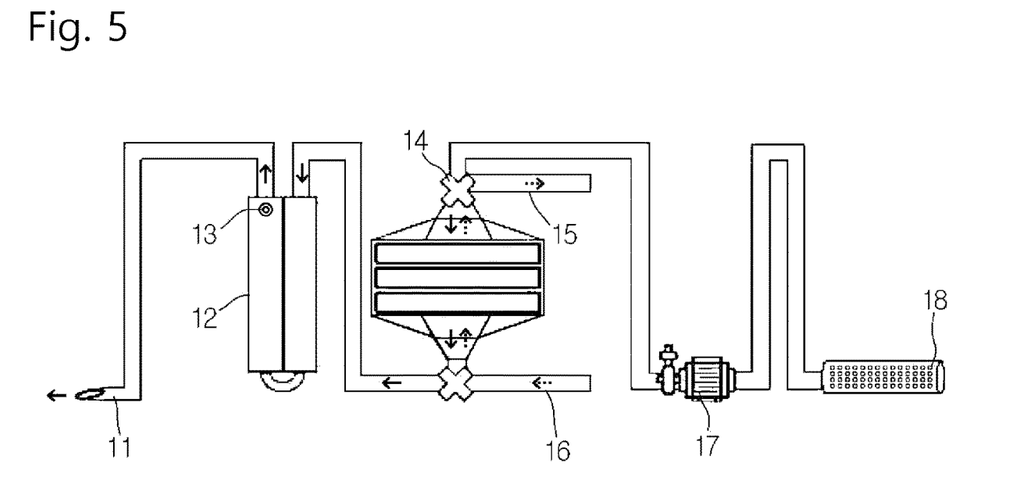
FIG. 5 is a diagram illustrating a combined system of an organic matter removal and oxygen dissolving device capable of automatic backwashing.

FIG. 5 is a combined system of an organic material removal and oxygen dissolving device capable of automatic backwashing. The organic material removal and oxygen dissolving device is configured to include an inlet 18 into which water is supplied from a breeding tank, a pump 17 that moves the breeding water to a filtering device, a filter 14 that is provided with a valve capable of backwashing and filtration, an inlet 16 through which washing water may be introduced during backwashing, an outlet 15 capable of draining the washing water during the backwashing, an oxygen dissolver 12 that dissolves oxygen in the filtered breeding water, an oxygen inlet 13 capable of introducing oxygen, and an outlet 11 through which the filtered water moves, thereby supplying oxygen and removing organic matters.

The automatic filtration system 300 of the present invention has the conventionally known breeding water filtration device structure, and may have a structure in which a plurality of square plate-shaped cartridge filters are inserted into, in a vertical direction at a regular intervals, a filtration tank in a shape of a square tank in which an inlet pipe through which the backwash water of the drum filter may be introduced and an outlet pipe through which the breeding water purified by a cartridge filter may move to the drum filter are provided at front and rear sides, respectively.

The automatic filtration system of the present invention may separate and wash the cartridge filter from the filtration tank very simply and easily and may perform backwashing by supplying washing water in an opposite direction to a flow direction of the breeding water as necessary, and may solve problems in which it is very cumbersome to take out a filter medium from the filtration tank and wash the filter medium in the case of the existing filtering device and a normal operation of a farm is impossible for a relatively long time until the filter medium is cleaned and the filter medium is used again.

In addition, the breeding water purified through the cartridge filter may be moved to the drum filter, supplied to the circulation filtration system, and then re-supplied to the breeding water tank, and the backwash water that does not pass through the cartridge filter is moved to the biofloc fermentation system. The biofloc fermentation system 400 of the present invention includes a biofloc fermenter 401 and a biofloc storage tank.

The term mentioned herein, the biofloc refers to a small mass in which microorganisms, algae, protozoa, and microparticles are aggregated. The biofloc purifies water and nourishes fish that is breeding. In general, only 20-30% of protein in feed given to the fish is actually consumed by fish, and the rest is dissolved in water and turns into harmful ammonia.

In the conventional biofloc (BFT) system, nitrogen and organic matters discarded in water are decomposed or formed into flocs, and the flocs are re-edible by fish. Small bioflocs are again aggregated with each other by an extra cellular enzyme secreted by microorganisms to form larger flocs, and as a result, are developed to a size that may be identified with the naked eye and are easily precipitated. As described above, when the small bioflocs are precipitated, the small bioflocs rapidly consume surrounding oxygen and become anaerobic, and cause toxic gas, but also it is necessary to pay attention to the supply of oxygen since the oxygen demand in the biofloc system is higher than in the general aquaculture system.

Figure 6:
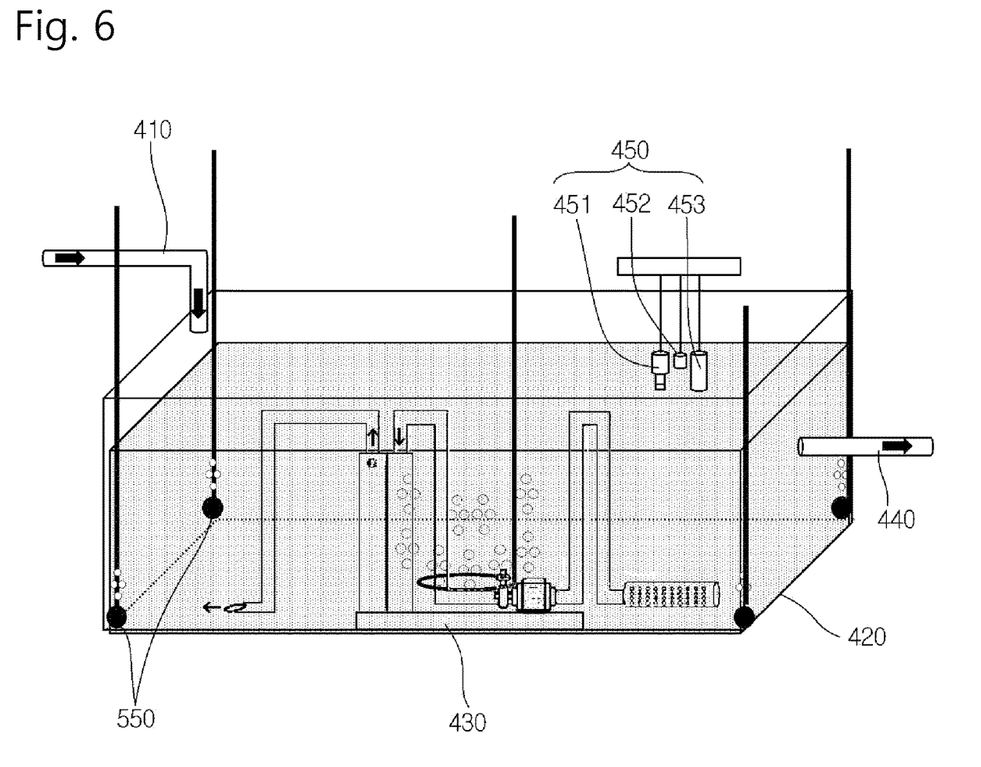
FIG. 6 is a conceptual perspective view of a biofloc fermentation system related to the present invention.

The structure of the biofloc fermenter and the storage tank is the same, and the breeding water moves from the fermenter to the storage tank. Accordingly, the biofloc breeding water introduced into the supply pipe of the fermenter may be backwash water that has not been filtered by the cartridge filter in the automatic filtration system, and the biofloc breeding water introduced into the supply pipe of the storage tank may be backwash water supplied from the fermenter.

FIG. 6 illustrates a schematic structural diagram of the biofloc fermentation system of the present invention. The biofloc fermentation system of the present invention may include a supply pipe 410, a storage tank and fermenter 420 in which the supplied biofloc breeding water is stored or fermented, an oxygen dissolving device 430 and one or more oxygen supply devices 550 that may be provided in the storage tank and fermenter to increase the amount of dissolved oxygen of biofloc breeding water and prevent organic matters from being precipitated through water flow generation, a water output pipe 440 that may be provided on any one side surface of the storage tank and fermenter to move the fermented breeding water to the storage tank or move the stored breeding water to a plant cultivation system, and a sensor unit 450 that is provided inside the storage tank and fermenter to measure the quality of the stored biofloc breeding water.

The sensor unit includes a temperature sensor 451, a DO sensor 452, and a pH sensor 453, and detects water temperature, a dissolved oxygen amount, and pH in water in real time, and may regulate the water temperature, a dissolved oxygen amount, and pH in water when they are regulated to an appropriate level as plant cultivation water. In addition, the oxygen supply device may be selected as a configuration of any one or more of the air stone, the water flow generator, and the minute air supply pipe, but is not limited thereto if aeration is possible.

Figure 7:
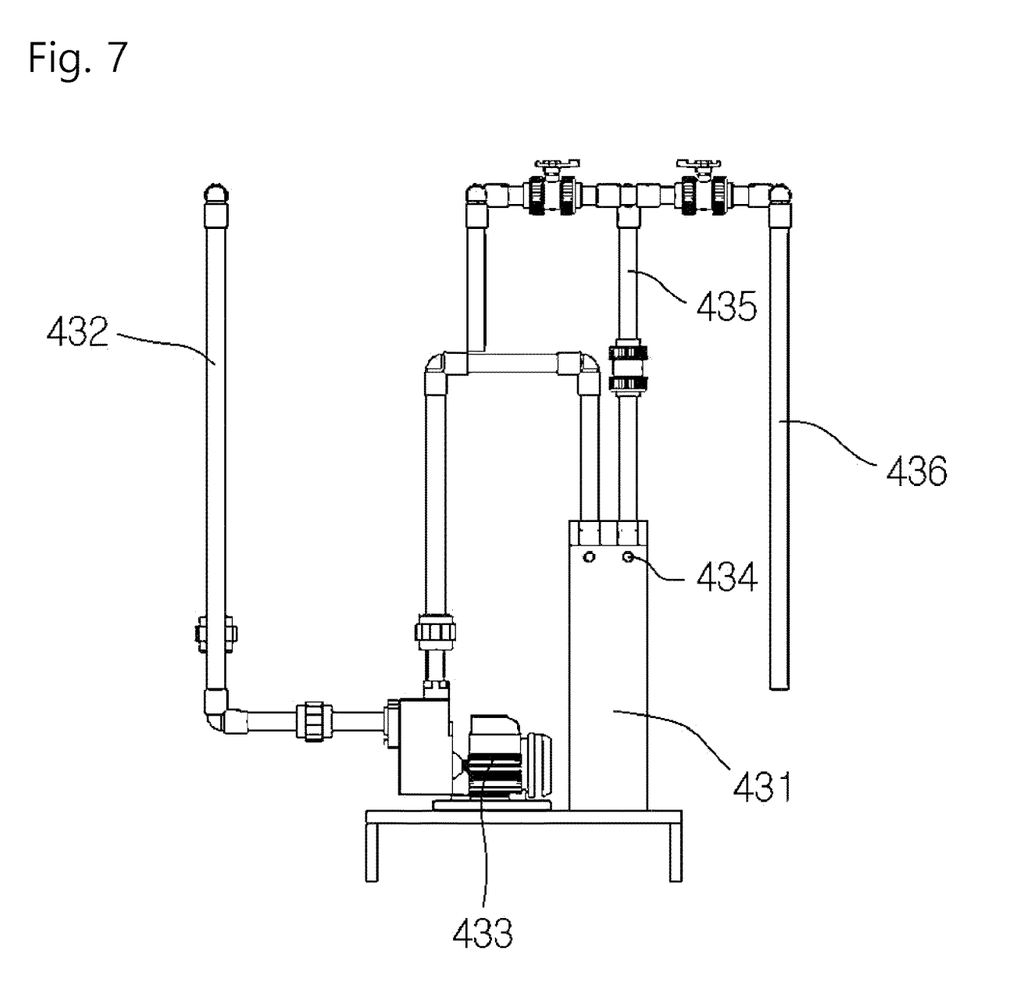
FIG. 7 is a diagram illustrating an oxygen dissolving device related to the present invention.

FIG. 7 illustrates the oxygen dissolving device of the present invention. In order for the water flow generator to collect the breeding water stored in the storage tank or fermenter into the oxygen dissolver 431, a breeding water intake device 432 is included in the storage tank and fermenter. The water flow generator is configured to include a circulation pump 433 that is used to collect breeding water into the oxygen dissolver and generate water pressure for discharging the breeding water back into the tank, an oxygen inlet 434 that is located on one side surface of the oxygen dissolver for introducing oxygen supplied from an oxygen source to the oxygen dissolver, a resistance plate (not illustrated) that is located inside the oxygen dissolver and increases the dissolved oxygen amount by mixing the breeding water with the oxygen supplied through the oxygen inlet at high efficiency by generating numerous bubbles as the breeding water introduced into the oxygen dissolver passes through due to water pressure, a mixed water supply pipe 435 that drains the breeding water mixed with oxygen back to the fermenter and storage tank, and a water flow generation unit 436 that generates a water flow inside the fermenter and storage tank connected to the outlet pipe.

A valve may be provided in the oxygen inlet to regulate the amount of oxygen supplied, and a valve may be provided in the water flow generator to regulate the presence or absence of water jet and the injection intensity. In addition, by additionally providing additional valves in all parts, the strength and weakness of all stages may be adjusted, and all the valves use solenoid valves to regulate opening and closing and operating pressure by remote control.

In addition, an aeration pump capable of supplying air, a high-pressure oxygen tank capable of supplying oxygen, etc., may be connected to the oxygen inlet located on one side surface of the oxygen dissolver. In addition, since the resistance plate is provided in a plurality of layers along a predetermined interval horizontally inside the oxygen dissolving tank, and generates numerous bubbles through multiple steps from the breeding water introduced into a body, and mixes the bubbles with oxygen supplied through the oxygen inlet at high efficiency, it is possible to provide the continuously high amount of dissolved oxygen to the breeding water.

When the water flow generator according to the embodiment of the present invention is provided, the breeding water stably exhibits a high dissolved oxygen content of 10 ppm or more. In this way, the continuous supply of oxygen is made and the accumulation of sludge and organic matters is prevented at the bottom, thereby increasing the amount of dissolved oxygen and preventing the organic matters from being precipitated.

In the biofloc fermentation system of the present invention, the content of total suspended matter (TSS), ammonia nitrogen, and nitrite nitrogen as unfiltered breeding water (backwashed breeding water) is high in the cartridge filter of the automatic filtration system, in particular, in order for plants to use nutrients in the plant cultivation tank, the total amount of suspended matter needs to be reduced, the biofloc fermentation system plays a very important role in lowering the TSS value.

The production of primary water is performed in the fermenter. In this way, the circulating storage tank produces more stable biofloc breeding water, and the TSS, ammonia nitrogen, nitrite nitrogen, and nitrate nitrogen values are lowered to a level that is easy for plants to use.

Figure 8:
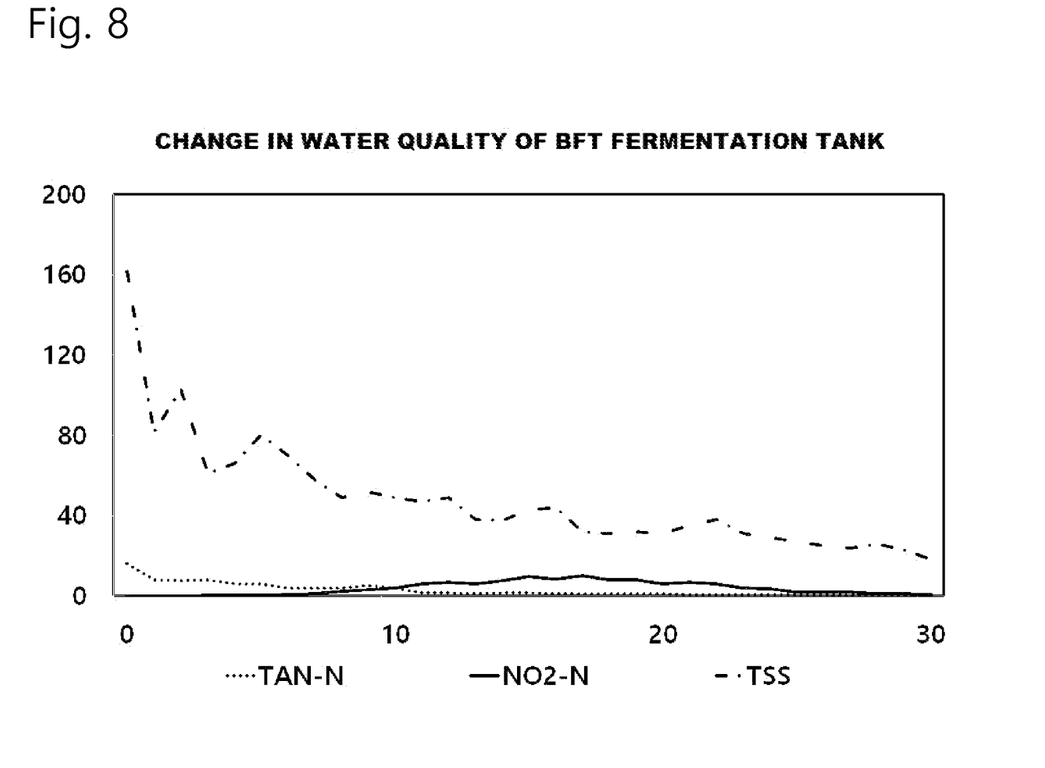
FIG. 8 is a diagram illustrating a change in water quality of the biofloc fermentation system related to the present invention.

FIG. 8 illustrates a change in water quality in the biofloc fermentation system. The sludge and organic matters moved to the BFT breeding water fermenter through the backwashing of the automatic backwashing organic solid removal device are used as nutrients such as carbon and nitrogen sources for BFT heterotrophic bacteria, and as time passes, it may be seen that the water purification occurs through the increase and decrease in ammonia (TAN-N) and nitrous acid ($NO_2$—N) over time, and the level of total suspended organic matter (TSS) also decreases significantly. From this, it is possible to replace the role of supplying additional liquid fertilizer to plants in the existing hydroponics method.

Figure 9:
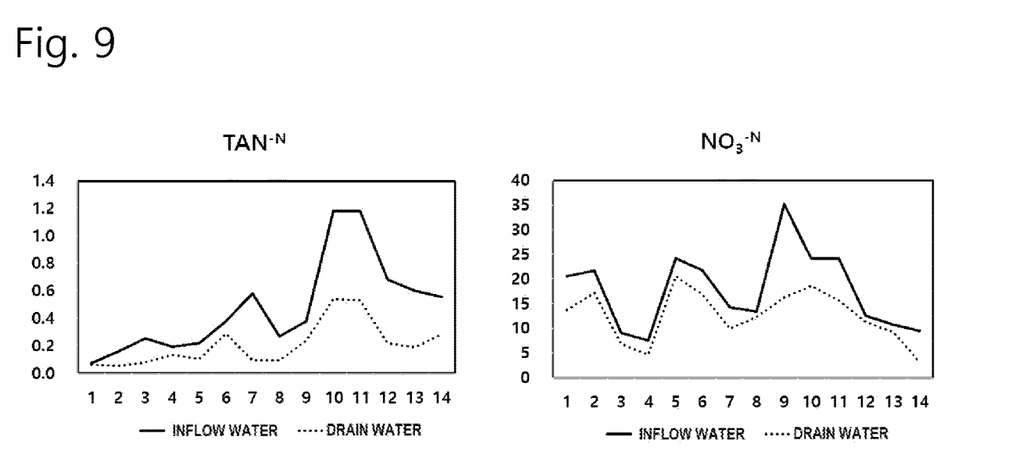
FIG. 9 is a diagram illustrating a graph of water introduced into the biofloc fermentation system and drain water.

FIG. 9 is a diagram illustrating a graph of water introduced into and water drained from the biofloc fermentation system. As a result of comparing the change in the water quality of breeding water through aquaponics cultivation (2 weeks), it may be seen that there is a difference between water introduced into and water drained from the plant cultivating device. That is, the amount of total ammonia nitrogen (TAN-N, ammonia nitrogen) and nitrate nitrogen ($NO_3$—N) used appears. In addition, the ammonia is also removed through the plant, and the nitrate nitrogen is removed only in a water exchange or an anaerobic tank, there is a problem that it continues to accumulate in the breeding tank and fish. However, as a result of water quality analysis, it may be seen that the nitrate nitrogen is gradually dropping to less than 20 as plants are used in large quantities, which means that it is transformed into a very ideal state as breeding water during fish breeding.

Figure 10:
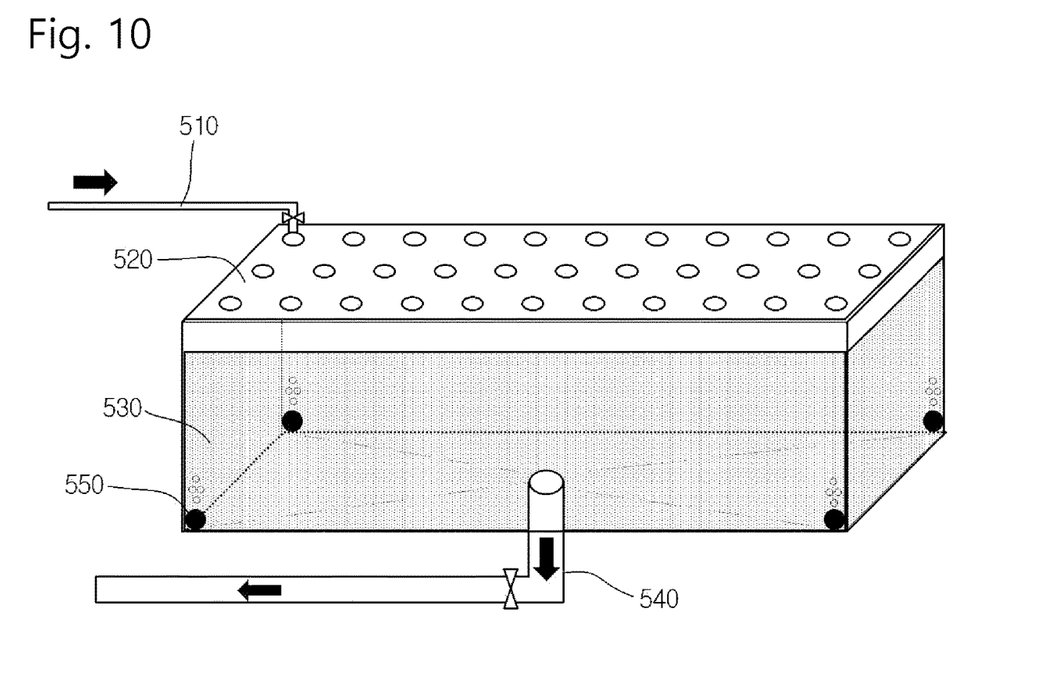
FIG. 10 is a diagram illustrating a plant cultivation system related to the present invention.

FIG. 10 illustrates the plant cultivation system of the present invention. The plant cultivation system 500 of the present invention includes a plant cultivation inlet pipe 510 into which the biofloc breeding water of the biofloc fermentation system is introduced, a cultivation table 530 that is provided with a space portion so that biofloc breeding water may be stored by being connected to the plant cultivation inlet pipe, a bed 520 in which plants are fixed on an upper portion of the cultivation table and formed so that the biofloc breeding water stored in the cultivation table may be used as a nutrient solution, one or more oxygen supply devices 550 that are provided inside the cultivation table, and a plant cultivation water outlet pipe 540 that is provided at a lower portion of the cultivation table and connected to an automatic filtration system, so the breeding water may be drained after being used for plant cultivation, may move to the an automatic filtration system, may pass through the filtration tank, and then may be re-supplied to the storage tank.

The bed may be formed in a structure in which the cultivation pot may be fixed during the conventional hydroponics. Cultivated plants, seedlings, and seeds are planted after the cultivation part is filled with filler. In this case, as the filler, artificial soil, such as rock wool, coco pit, and perlite, which is generally used for hydroponics, sponge, or styrofoam may be used. In the case of the artificial soils, it is easy to support roots of cultivated plants, and the solid of the cultivated water may be partially filtered. The cultivation part may be made of a material such as web with good permeability so that the cultivated water may sufficiently reach the cultivated plant.

A valve may be provided in the plant cultivation inlet pipe and the plant material outlet pipe to regulate the inflow and outflow amount. The organic matters are not precipitated and may be directly discharged through the plant cultivation water outlet pipe with a gradient structure in which a slope is formed toward the center at the bottom of the cultivation table connected to the water outlet pipe. The oxygen supply device may be selected as a configuration of any one or more of the air stone, the water flow generator, and the minute air supply pipe, but is not limited thereto if the aeration is possible.

The hydroponics using the existing RAS breeding water may not directly supply the RAS breeding water as the cultivation water, and is provided after the concentration of nutrient solution is regulated, but the RAS breeding water supplied as the cultivation water of the present invention is the breeding water that contains nutrients necessary for fermentation, high dissolved oxygen amount, and plant cultivation through the biofloc fermentation system and does not need to undergo a series of fertilization (nutrientization) processes.

In addition, in the RAS breeding water introduced into the plant cultivation inlet pipe, organic matters such as ammonia generated as sludge provide nitrogen which is a nutrient necessary for plant cultivation, so there is an effect that the breeding water may be purified before being used through the process of absorbing organic matters by plants. In addition, the breeding water from which nitrogen has been removed is purified through the automatic filtration system, the drum filter, and the circulation filtration system, and thus, may be recycled as the breeding water of the RAS aquaculture system.

The present invention is the breeding system that uses the RAS breeding water to recycle organic matters generated by applying the recirculating method to the biofloc, remove the sludge and organic matters, ferment the BFT breeding water, and grow plants through a series of processes. It is possible to reduce the risk of diseases from the outside by circulating a breeding water of a closed circuit, reduce heating costs by minimizing the inflow of groundwater, and prevent environmental problems by preventing wastewater from occurring. It is possible to reduce the risk of toxicity occurring during fish breeding by removing ammonia and nitrite nitrogen from fish breeding through plant cultivation, reduce plant nutrition costs by supplying organic matters generated by using fish breeding water, and produce fish and plants at the same time.

The configuration and method of the described embodiments are not limited to the recirculating aquaculture system using the biofloc fermenter and aquaponics described above. All or some of the respective exemplary embodiments may be selectively combined with each other so that the above-mentioned exemplary embodiments may be variously modified.

The invention claimed is:

1. A recirculating aquaculture system using a biofloc fermenter and aquaponics, comprising:
   a breeding water tank that breeds farmed fish;
   a first filtration unit that separates a solid from drain water of the breeding water tank;
   a second filtration unit that secondarily filters water passing through the first filtration unit;
   a biofloc fermenter that proliferates microorganisms of the water that passes through the second filtration unit and stabilizes water quality;
   a cultivation unit that is formed to allow plant cultivation through the water passing through the biofloc fermenter; and
   a third filtration unit that filters the water passing through the cultivation unit and transmits the filtered water back to the breeding water tank,
   wherein the first filtration unit includes a drum filter formed to separate the solid by rotation, and the second filtration unit includes a backwash mode by changing a water flow direction,
   wherein the biofloc fermenter is configured so that sludge and organic matter included in backwash water generated by backwashing of the second filtration unit are decomposed by heterotrophic bacteria to stabilize the water quality,
   wherein the biofloc fermenter is formed in plurality, and is formed so that the breeding water is processed step by step, and
   wherein the biofloc fermenter includes:
      a supply pipe,
      a fermenter in which biofloc breeding water supplied through the supply pipe is stored or fermented, and
      an oxygen supply device for generating water flow formed inside the fermenter to (a) increase an amount of dissolved oxygen in the biofloc breeding water and (b) prevent organic matter from being precipitated through water flow generation.

2. The recirculating aquaculture system of claim 1, wherein the breeding water tank includes:
   a pump that forms a recirculating water flow; and
   a ring-type air supply unit that is disposed at a bottom to prevent precipitation of an organic solid in a low flow velocity region of a center of the recirculating water flow.

3. The recirculating aquaculture system of claim 1, wherein the third filtration unit includes a biological filtration tank to remove nitrite included in water that passes through the cultivation unit.

* * * * *